United States Patent [19]

Warmuth et al.

[11] Patent Number: 4,673,168
[45] Date of Patent: Jun. 16, 1987

[54] AIRSPRING AND A METHOD FOR MAKING AIRSPRING FLEXIBLE MEMBERS

[75] Inventors: Ivan J. Warmuth, Akron; Carl K. Safreed, Jr., N. Canton, both of Ohio

[73] Assignee: The Goodyear Tire & Rubber Company, Akron, Ohio

[21] Appl. No.: 748,539

[22] Filed: Jun. 25, 1985

[51] Int. Cl.$^4$ .................. B32B 31/04; F16F 5/00; F16F 9/04
[52] U.S. Cl. .................. 267/64.27; 156/187; 156/245; 267/122; 264/258
[58] Field of Search .................. 267/122, 64.27, 35, 267/64.11, 64.19, 64.21, 64.23, 64.24, 123, 118; 156/245, 194, 184, 191, 132, 148, 187; 92/98 R, 98 D, 103; 264/258, 259; 188/298; 29/445, 508

[56] References Cited

U.S. PATENT DOCUMENTS

| | | | |
|---|---|---|---|
| 2,980,571 | 4/1961 | Mosshart et al. | 267/64.27 X |
| 3,013,920 | 12/1961 | Harris et al. | 267/64.27 X |
| 3,030,252 | 4/1962 | Edgerly et al. | 267/64.27 X |
| 3,036,180 | 5/1962 | Greenwood | 267/64.27 X |
| 3,043,582 | 7/1962 | Hirtreiter | 267/64.27 X |
| 3,130,965 | 4/1964 | Niclas | 267/64.27 |
| 3,191,964 | 6/1965 | Chambers | 267/64.23 X |
| 3,319,952 | 5/1967 | Travers | 267/64.27 |
| 3,794,538 | 2/1974 | Christie et al. | 156/187 |
| 3,870,286 | 3/1975 | Willich | 267/64.24 |
| 4,378,935 | 4/1983 | Brown et al. | 267/64.27 |

FOREIGN PATENT DOCUMENTS

830283 3/1960 United Kingdom ............ 267/64.27

Primary Examiner—Douglas C. Butler
Attorney, Agent, or Firm—R. D. Thompson

[57] ABSTRACT

A method of manufacturing a beadless flexible member for an airspring having a fully molded non-tubular shape. An axially segmented mold with tapered circular end bores is used with conically tapered end plugs which sealingly compress an uncured preform of the flexible member between the conical plugs and the tapered circular end bores. Compressed fluid is injected into the interior of the preform to radially expand it to the desired molded shape. At a rate determined by the radial expansion of the preform, the annular segments of the mold are axially moved together to accommodate the axial foreshortening of the preform during its radial expansion. After full axial closure of the mold, heat and pressure are applied to vulcanize the preform. The beadless, fully molded flexible member may be used for airsprings requiring zero pressure roll capability. Preferred forms of the flexible member have tapered wall thickness in the neck with circumferential indexing ribs for exact placement of compression rings on the finished airspring.

14 Claims, 17 Drawing Figures

AIRSPRING AND A METHOD FOR MAKING AIRSPRING FLEXIBLE MEMBERS

BACKGROUND OF THE INVENTION

This invention relates generally to airsprings and in particular to fully molded, beadless, flexible rubber members used in airsprings requiring zero pressure roll capability.

Conventionally known airsprings can be classified in several ways. The first classification is by form. Rolling lobe, bellows and sleeve type airsprings are representative of this classification. Secondly airsprings may be classified by the manner in which they are attached to the rigid retainers or pistons of the airspring assembly. In this classification there are beaded forms of airsprings and beadless. The terms "beaded" and "beadless" refer to presence or absence respectively, of a non-extensible, nonductile bead wire or assembly in the cured flexible member. The third classification system is directed to the nature of the flexible member of the airspring assembly. This flexible member may be a sleeve type or a fully molded membrane. The fully molded type is one which assumes a natural molded shape even when the airspring has no internal pressure. Generally the molded shape is of non-uniform radial diameter along the axial length of the airspring. The non-molded type of airspring member is a uniform diameter tubular structure which collapses axially downward on itself when there is a zero pressure condition inside of the airspring.

It is clear that the above-described classification systems overlap and in fact it is felt that nearly every airspring configuration could be classified in all three systems. Prior to this invention all fully molded airspring flexible members were of the bead construction. This is understandable in view of the necessary function which the bead structure has always served in the molding process. The bead is seated in the mold recesses provided and established (1) the internal air seal and (2) the exact axial spacing between the beads of the finished airspring. The seating of the beads of the uncured preform sleeve in the mold recesses is necessary to securely hold the sleeve in position in the forming mold during the application of very high pressures in the interior of the airspring during cure. These pressures are necessary for radial deformation of the fabric reinforced uncured preform. The oppositely laid bias fabrics of the uncured preform sleeve pantograph during the internal pressurization and create great axial stresses downward on the bead area of the preform. The placement of the beads in the provided recesses of the mold resist these axial stresses during the forming portion of the vulcanization step.

This invention provides for the first time a method of molding flexible members to exact molded configurations without the requirement that beads be built into the axially extreme ends of the flexible member. The elimination of internally molded beads in fully molded membranes results in substantial economies derived primarily from (1) elimination of the requirement that only a single flexible member preform may be built at a time, (2) eliminates the time and extra material involved in placing the beads and turning up the fabric over the beads, (3) more than one flexible member may be cured in the same mold from a single preform.

In addition to the economies described above the airspring made with this beadless fully molded flexible member has improved flexing function due to the elimination of the bead turnup area and the resulting localized stresses which develop in this heavily reinforced overlapped area during service. Secondly, a uniform wall thickness is achieved since no bead turnup is required. This uniformity of wall thickness assures a smooth spring rate curve even at the extreme ends of the loading cycle of the airspring.

The terms upper, lower, top, bottom, outward and inward are all oriented by reference to the figures. The terms axis, axial or coaxial always refer to an axis of symmetry or rotation of the mold, membrane or finished airspring.

BRIEF DESCRIPTION OF THE INVENTION

One aspect of the invention is a method for molding non-uniform diameter, flexible membranes for airsprings in a mold having a plurality of coaxial annular segments including a top and a bottom annular segment each containing a coaxial circular end bore with an inward taper, said plurality of segments forming a mold cavity having a predetermined shape said method comprising the steps of:

(a) plying up a plurality of rubber and fabric layers to form a uniform diameter, beadless, tubular preform with a predetermined wall thickness, having a first and second end portions;

(b) inserting said tubular preform into said mold;

(c) positioning said first and said second end of said preform onto first and second conical end plugs coaxially spaced away from said circular end bores, said conical end plugs having a complimentary shape to fit axially into said inward taper of said circular end bores of the mold with enough clearance to accommodate the tubular preform wall thickness;

(d) moving said top and said bottom segments axially outward to sealingly compress said tubular preform between said top and bottom end plugs and said top and bottom segments, said movement of the top and the bottom segments opening an annular space between said plurality of annular segments axially distal the end plugs;

(e) applying pressure to the tubular preform to deform the preform radially outwardly against the mold cavity;

(f) simultaneously with step (e) axially compressing said annular segments to gradually close up said annular space, at a rate sufficient to accommodate the axial shortening of the preform as it expands radially outward under pressure of step (e);

(g) continuing steps (e) and (f) until said preform completely conforms to the mold cavity and the plurality of annular segments of the mold are axially compressed together;

(h) heating said preform to permanently set the non-tubular shape by vulcanizing the rubber layers of said preform to form a non-uniform diameter, flexible membrane:

(i) removing said membrane from said mold.

Another aspect of the invention is a curing mold for beadless fabric reinforced rubber membranes used in airsprings comprising:

(a) a plurality of coaxial annular segments having circular openings with a smooth inward taper at the axially extreme ends, said annular segments having non-uniform diameter interior surfaces forming a central curing cavity;

(b) a first and a second conical end plug having a predetermined taper and coaxially positioned within each circular opening at the axially extreme ends of the annular segments, the outside diameter of said end plugs being smaller than the inside diameter of said circular openings.

Yet another aspect of this invention is an airspring with a beadless, molded, non-uniform diameter, flexible membrane comprising:

(a) an upper retainer;

(b) a lower retainer axially spaced apart from said upper retainer;

(c) a non-uniform diameter, beadless, air impervious, flexible membrane having a first and a second open end, at least one of said ends having a tapered neck portion with a radial wall thickness which decreases toward the axially extreme end of the neck portion, said membrane being joined with said upper retainer and said lower retainer to form a working cavity therebetween:

(d) an upper ring and a lower ring compressively engaging the membrane against the upper retainer and the lower retainer, thereby forming an airtight seal between the membrane and the upper and the lower retainers.

DETAILED DESCRIPTION OF THE INVENTION

Figure 1:
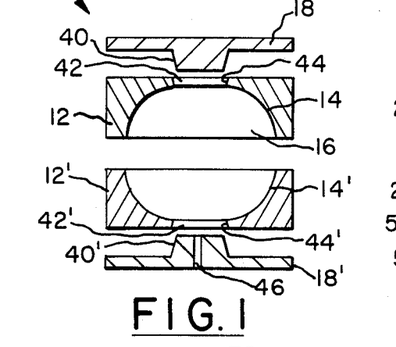
FIG. 1 is an axially cross-section mold used in the practice of the invention for making bellows airspring.
Figure 2:
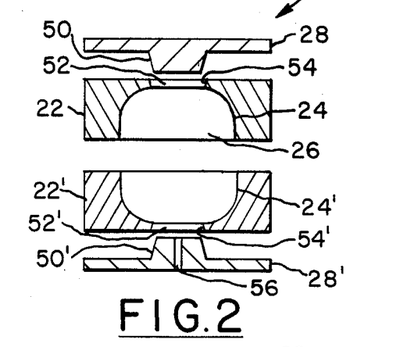
FIG. 2 is an axial cross section of a mold used in the practice of the invention to manufacture two rolling lobe flexible members in a single mold.
Figure 2A:
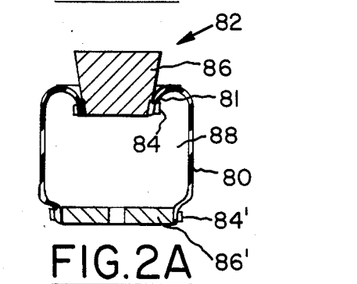
FIGS. 2A and 2B are rolling lobe airsprings using a beadless flexible member of the invention.
Figure 2B:
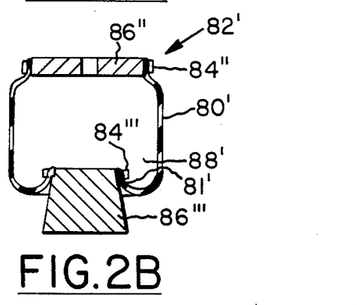
Figure 3:
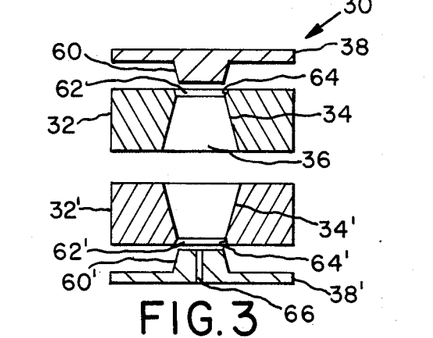
FIG. 3 is an axial cross-section of a mold used in the practice of the invention to manufacture a pair of tapered sleeve flexible members.
Figure 3A:
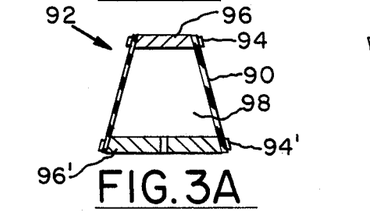
FIGS. 3A and 3B are tapered sleeve airsprings utilizing the beadless flexible member of the invention.
Figure 3B:
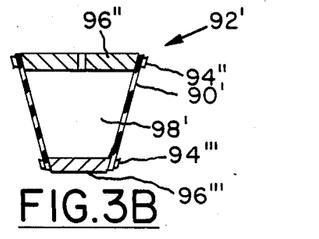

Referring now to FIGS. 1, 2 and 3 there are illustrated various mold configurations capable of forming flexible membranes for use in airsprings of different types. Each mold 10,20,30 is composed of coaxial annular segments 12,12',22,22',32,32'. When the coaxial annular segments are clamped together the interior peripheral surface 14,14',24,24',34,34' form a central curing cavity 16,26,36, which have a configuration which is identical to the desired shape of the airspring membrane which will be cured therein. Cavity 16 is a shaped characteristic of a single convolute bellows form of airspring. Cavity 26 forms the exterior surface of two flexible membranes of identical but inverted single rolling lobe airsprings, generally depicted in FIGS. 2A and 2B. The cavity 36 forms two flexible membranes for tapered sleeve airsprings generally depicted in FIGS. 3A and 3B. Each mold 10, 20 and 30 includes an axially opposed pair of conical end plugs 18, 18',28,28'.38,38'. The mold opposing surface 40,40',50,50',60,60' of the end plug includes a degree of taper which allows the conical end plug to fit within the circular end bores 42,42',52,52',62,62'. The inward taper 44,44',54,54', 64,64' of the circular end bore faces the mold opposing surfaces of the end plug across an annular space into which the membrane to be cured will be placed. The relative diameters of the circular end bore of the annular segments and the diameter of the conical portion of the end plugs is a critical relationship. The conical end plug should be of lesser diameter than the circular bore of the annular segments of the mold to allow space for the uncured reinforced rubber membrane to be wedged securely between the outside diameter of the end plug and the circular bore of the annular segments.

An air passage 46,56,66 is provided in at least one of the end plugs to allow for pressurization during the vulcanization step in which these molds are utilized. FIGS. 1, 2 and 3 are shown as exploded views in order to more clearly show the individual components. It is understood that in use the molds 10,20,30 are tightly axially compressed to closely associate the individual parts. It should be readily appreciated that while the annular segments shown for each individual mold are illustrated as being in two axial segments it is clear that depending on the axial dimension and shape of the desired airspring membrane to be formed there may be many more than two such annular segments which form the finished mold. In any case, the axially outermost end segments contain the circular bores into which the conical end plugs must fit.

Figure 1A:
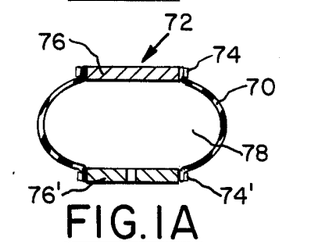
FIG. 1A is schematic representation of a bellows airsprings using a flexible member of the invention.

The molds shown in FIGS. 1, 2 and 3 are utilized to form molded, beadless flexible membranes 70,80,80',90,90' for types of airsprings requiring molded membranes. This molded membrane is to be distinguished from the tubular sleeve type airspring in which the membrane has a uniform diameter tubular shape when under zero pressure conditions. Mold 10 of FIG. 1 was used to form flexible member 70 for what is conventionally known as a single convolute bellows airspring 72 of FIG. 1A. Mold 20 of FIG. 2 was used to form the flexible members 80 and 80' for both airsprings 82 and 82' which are rolling lobe type diaphragm airsprings. The mold produces the flexible members 80 and 80' in a taper ended molded sleeve which is cut in half to form the individual flexible members 80 and 80'. The ends 81 and 81' are the portions that were cured between the end plugs 28,28' and the end bores 52, 52' respectively. Similarly the mold 30 of FIG. 3 is used to form a pair of tapered flexible members 90 and 90' in a single molding operation. In a subsequent step to the molding or vulcanization, the sleeves are separated by cutting the molded sleeve in half and forming two opposed tapered sleeves for airsprings 92,92'. These tapered sleeves may be mounted on an air adjustable shock absorber (not shown).

While the simultaneous molding of dual flexible members illustrated in FIGS. 2 and 3 are desirable from a production efficiency standpoint, it may be desired to form a rolling lobe or tapered sleeve member singly in a mold. In this case, a mold configuration more similar to FIG. 1 in operation would be utilized with the end plugs 18 and 18' forming the opposite ends of the flexible member.

Airsprings 72,82,82',92,92' are simplified schematic representations of distinct types of airsprings for which molded flexible members are desirable. This type is required in applications in which the flexible member must maintain its original shape even with no internal pressure. This requirement is termed zero pressure roll capability. Rolling lobe springs for trucks and all types of bellows airsprings are representative, not limitative examples. The common characteristic among all the airsprings represented in this invention is that the flexible members must be beadless, that is, they contain no integrally molded bead structure. The flexible members made in molds 10, 20 and 30 are of a beadless type and yet are fully molded flexible members. Rather than attaching an air spring through the use of the integral bead these inexpensive and highly functional flexible members, 70,80,80',90,90' all are attached to the airspring through the use of a suitable means for creating an air seal. Crimp rings 74,74',84,84',84",84"',94,94',94", 94"' are shown as one means for establishing a positive air seal. Any swage, compression or crimp ring as are conventionally known may be used. Ductile materials which can be mechanically crimped, swaged or otherwise shrinkfit to compressively engage the flexible member against a retaining member are suitable. The various types of airsprings utilize different retaining members due to the unique requirements of each type of airspring. A retainer means may have several functions including functioning as a means for attachment of the airspring to an underlying structure. The upper and lower retainers 76,76',86,86',86",86"',96,96',96",96"' serve as the structure which abuts the flexible member and against which the ring is compressed with the flexible member 70,80,80',90,90' securely compressed between. When the mechanical fastening by rings or other means is suitably carried out, an assembly including the rings, the retainers and the flexible member of the airspring form an air impervious seal and create a working cavity 78,88,88',98,98'. In the rolling lobe configuration shown in FIGS. 2A and 2B one retainer takes the form of a piston 86,86"' over which the flexible member forms a rolling lobe or meniscus during its axial travel in service.

Method for Manufacturing Flexible Member

The molds of this invention illustrated at FIGS. 1, 2 and 3 all feature a conical end plug for sealing the interior of the preform. These molds allow for utilization of straight sleeve tubular preforms which can then be inserted into the mold and quickly sealed by moving the end seals into place. These straight sleeve beadless preforms are economically and efficiently built by manual or automated methods. Since no bead is required in this method of manufacturing, the tubular preform may be extremely elongated and of sufficient length that many preforms may be cut from a single sleeve. Alternatively, molds can be stacked vertically to receive a single long preform.

By contrast, each flexible member of a beaded airspring must be built individually. Both beads must be positioned and the elastomer/fabric composite then rolled around the bead (bead turnup). This high cost, highly labor intensive step of bead inclusion is eliminated by using the method of this invention.

Figure 5:
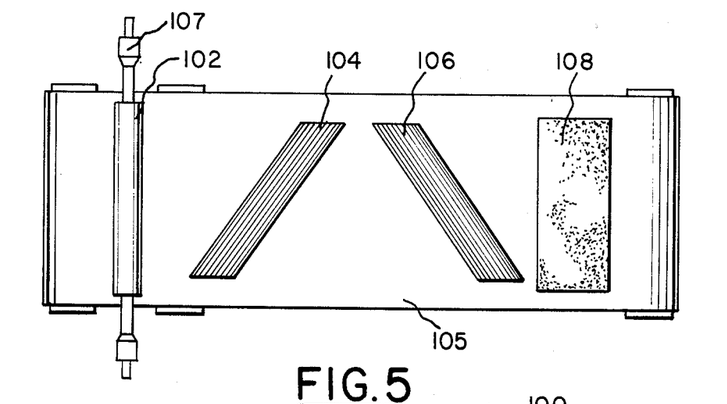
FIG. 5 is a diagrammatic representation of the building of an uncured preform sleeve.
Figure 6:
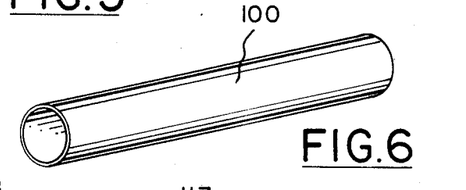
FIG. 6 is the uncured preform sleeve made according to FIG. 5.

The first step in the method for making flexible shaped airspring membranes is the building of the uncured preform. FIG. 5 is a schematic diagram which illustrates generally the simplest steps of sleeve building. The individual components are an innermost rubber layer 102, fabric layers 104,106 and a cover layer of rubber 108. Any efficient method for plying up the basic layers of the tubular preform 100 will be suitable for use in this method. One preferred automated method is disclosed in U.S. Pat. No. 3,794,538 in which the first rubber layer 102 is extruded in a separate operation, slightly expanded and slipped over a rotatable mandrel 107. Fabric layers 104,106 are bias cut fabrics which have their fibers running in opposed directions. A first fabric layer 104 is spirally applied to the mandrel 107 overlying the tube 102. Subsequently the second fabric ply 106 is spirally wound in an opposite sense over the first fabric layer and finally a cover layer of calendered rubber 108 is applied over the underlying layers. The structure shown in FIG. 5 underlying the individual components is simply a moving belt 105 which facilitates material handling during buildup. It is understood that the tubular preform 100 of FIG. 6 may contain any number of fabrics and the particular bias angles of the fabric are determined in conventional manner by the type of airspring being manufactured.

Figure 7:
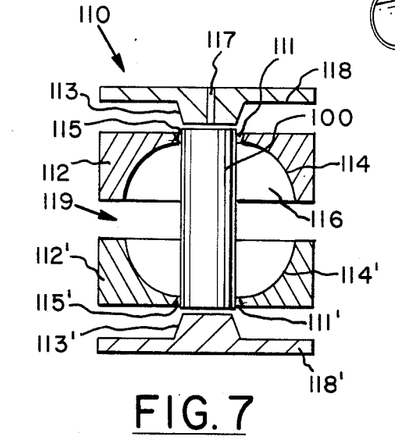
FIG. 7 is a schematic representation of the loading of the preform into a mold shown in axial cross-section.
Figure 8:
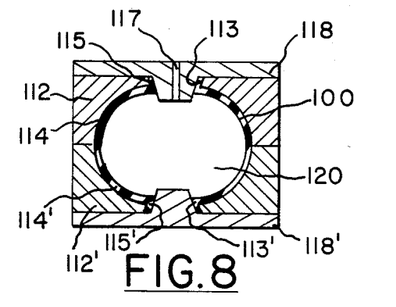
FIG. 8 is a schematic representation of the closed mold in axial cross-section with the preform member inside and expanded.

The following discussion relates to FIGS. 7 and 8. The mold 110, consisting of the top conical end plug 118, the top annular segment 112, the bottom annular segment 112' and the bottom conical end plug 118' is positioned within a press adapted to independently move each segment axially. The top end plug 118 is axially withdrawn upward far enough to allow the insertion of preform 100 into the mold 110 through the top circular end bore 111. The preform 100 is pushed down through the bottom circular end bore 111' and over the conical end plug 118'. FIG. 7 shows the process just prior to positioning the preform 100 over the bottom end plug 118'. The top end plug 118 is then axially moved downward until it is positioned within the tubular preform 100. It is to be noted that the preform when it is correctly positioned on end plugs 118 and 118' is slid down over the conical mold facing portion 113 and 113'. The next crucial step in the method is that of establishing an airtight seal between the preform 100 and the end plugs 118 and 118'. This is accomplished by moving the annular end segments 112,112' axially outward toward the end plugs 118 and 118' which are now fixed in axial position. This movement is continued until the inward taper 115, 115' of the circular end bores 111 and 111' compressively engage the outer periphery of the tubular preform 100. Although FIG. 8 shows a later stage of the method it is useful to observe that the preform is firmly and compressively engaged on the inside by the mold facing conical portion of 113, 113' of end plugs 118, 118'.

The axial movement of segments 112 and 112' outwardly toward the end plugs opens up a substantial axial gap 119 between the center segments 112 and 112'. This annular space between normally abutting sections of adjacent annular segments is a necessary configuration given the substantial radial deformation that the preform 100 undergoes in the subsequent steps of the method.

An orifice 117 is provided in one end plug 118 in order to allow the pressure to be introduced to the interior 120 of the preform 100. Pressurized air, steam or other fluid is applied to the interior 120 of the tubular preform 100 which begins to force the preform radially outward toward the inner peripheral surfaces 114 and 114' of the annular segments 112 and 112'. During this radial deformation of the uncured preform 100, the bias fabrics 104 and 106 are pantographing relative to one another to allow this radial expansion without breakage of the filaments and yarns of the fabrics 104 and 106. The introduction of pressure into the interior of the preform and the radial expansion of the preform necessarily shortens the preform in the axial direction. In order to prevent the preform from drawing off of the conical mold facing portion 113, 113' of the end plugs 118,118' it is essential that each half of the mold be drawn axially together at a rate proportional to the rate of radial expansion of the preform. Each mold half consists of an end plug and the annular segment into which the end plug is positioned. This simultaneous coordination of the axial shortening or axial compression of the mold segments with the radial expansion of the preform is critical to the maintenance of the pressure tight seal between the preform wall and the end plug. The application of progressively greater pressure and simultaneously coordinated axial movement of the segments toward each other continues until the preform fully expands into intimate compressive contact with the inner peripheral surfaces 114 and 114' which form the mold cavity 116 which defines the final molded form of the flexible airspring member being molded.

FIG. 8 shows the fully expanded preform and the mold segments in their final position during vulcanization or cure of the rubber flexible member. Heat is applied to the preform 100 to permanently set the final shape through the vulcanization of the rubber layers 102 and 108 of the preform. Heat may be applied by pressurized steam introduced into the interior 120 of the preform and/or through the mold segments 112,112',118,118'. The heat/pressure is maintained on the preform for a time sufficient to cure the preform into a permanently shaped membrane 122 shown in FIG. 9. Once full cure has been achieved, the shaped membrane 122 is removed. In this condition the membrane has a non-uniform diameter which it is capable of maintaining even with no internal pressure. The removal is accomplished by axially separating annular segments 112 and 112' at the middle junction and moving 118 and 118' end plugs a sufficient distance axially outward to release the cured membrane 122 to be removed from the center.

Figure 9:
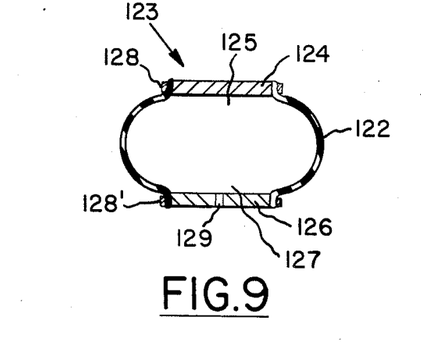
FIG. 9 is a single convolute bellows airspring assembled from a beadless flexible member of FIG. 8.

Referring now to FIG. 9, the shaped membrane 122 shown assembled into a single convolute bellows airspring 123 having an upper retainer 124, a lower retainer 126 where the shaped membrane 122 is a non-uniform diameter beadless air impervious flexible membrane having open ends 125 and 127 which are compressively fitted over the upper retainer 124 and lower retainer 126 respectively with swage rings 128 and 128'. The swage rings are radially compressed into contact with the membrane 122 to effect an airtight seal between the inner peripheral surface of the membrane 122 and the upper and lower retainer rings. Orifice 129 is shown in the lower retainer for illustration purposes only. A suitable pressure valve will be installed therein in order to inlet and exhaust pressurized gas to actuate the bellows airspring.

Figure 4:
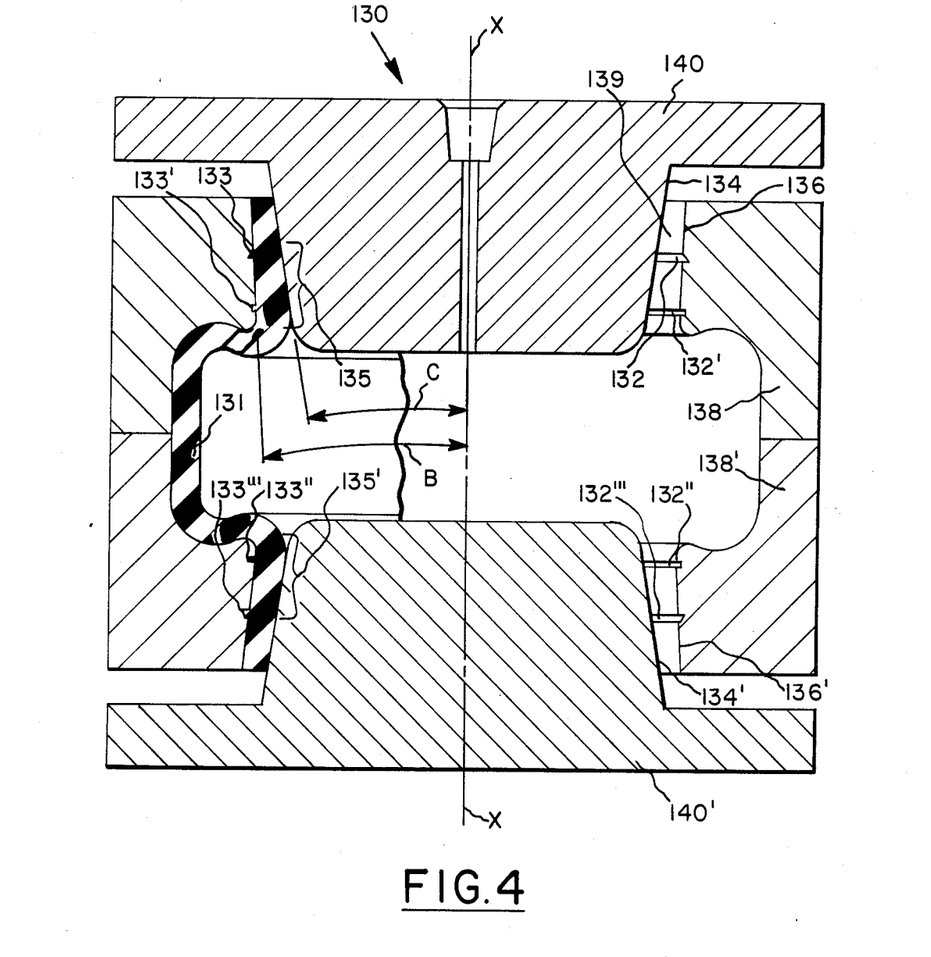
FIG. 4 is an axial cross-section of a mold used in the manufacture of flexible membranes incorporating indexing ribs and tapered neck portions of the membrane.

Reference is now made to FIG. 4. For illustrative purposes only, the right half of the mold 130 is shown without a flexible membrane. The left half shows a flexible membrane 131 which has been cured within the mold. The mold 130 is an especially preferred form of this invention which allows the rubber membrane 131 to have specially desirable features. Specifically the shallow circumferential grooves 132, 132', 132'',132''' provide very precisely located indexing ribs 133, 133', 133'',133''' on the membrane 131. These precisely located indexing ribs are very helpful in positioning swaging rings accurately on the exterior of the membrane during assembling of a finished airspring. Particularly with a fully molded bellows airspring such as the one which would be made from the membrane 131 cured in the mold 130, it is very difficult to precisely locate the swage rings relative to each other and relative to the retainer members of the finished airspring. It is very important that the swage rings be accurately located since the distance between the swage ring has a great affect on the dynamic characteristics of the airspring. Molding of the indexing ribs makes the preassembly of the airspring with the swage rings very simple and assures exact location of the swage ring on the retainer and the flexible member during the axial crimping or swaging operation.

Another unique advantage which the mold and method of this invention provides in the fully molded beadless airspring is that the wall thickness of the neck portions 135,135' of the membrane 131 can be very precisely controlled due to the opposing surfaces of the mold in that area. In particular, the conical end plug mold facing surface 134 and 134' and the inward taper surface 136,136' of the annular mold segments 138,138' form an annular space 139 in the empty mold which dictates the exact radial dimension of the neck portion 135. The inward tapered surface 136 and 136' of the annular mold segments 138,138' forms an angle B with the axis of symmetry X—X of the mold. The mold facing surfaces 134,134' of the conical end plugs 140,140' form an angle C with axis X. The radial wall thickness of the neck portion 135 may be precisely controlled by varying the angles B and C relative to each other. If B equals C then the neck area has a uniform radial thickness. If C is greater than B the neck area will be of the smallest radial thickness at the extreme axial outermost portion of the neck area and greatest in radial dimension toward the axially innermost portion of the neck 135. Conversely if B is greater than C the neck area will be of tapered thickness with the largest radial thickness being at the axially outermost portion of the membrane neck portion 135.

Figure 10:
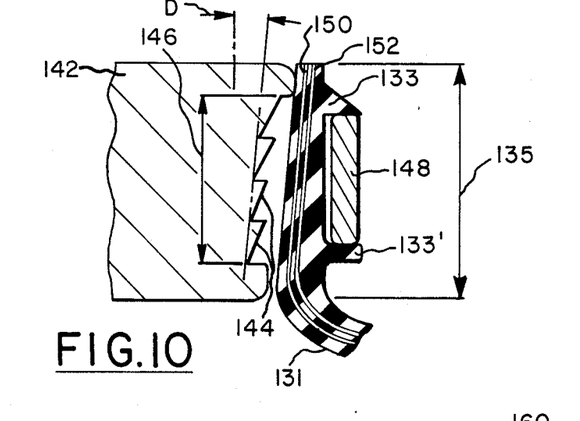
FIG. 10 is a view of a segment of an airspring incorporating a preferred form of the flexible member and a tapered retaining member shown prior to swaging.

FIG. 10 shows the portion of an airspring where the flexible member 131 made in mold 130 of FIG. 4 is positioned adjacent to a retainer 142. The outer peripheral surface of the retainer 142 contains a plurality of serrations 144 which forms the clamping surface 146. A swage ring 148 is shown positioned between the rectangular inner rib retainer 133' and the tapered outer rib 133. The bias fabrics 150 and 152 are shown as lines within the flexible member 131. FIG. 10 illustrates the most preferred spatial relationship between the retainer clamping surface 146 and the tapered neck area 135 of the flexible membrane 131. The clamp profile Angle D is measured relative to the centerline of the airspring. The taper (Angle C minus Angle B of FIG. 4) of the wall of membrane 131 is most preferably equal to the Angle D. This preferred relationship between the clamp profile and the tapered wall thickness hereinafter is called complementary tapers. Improvement derives from the fact that when the swage ring 48 is radially compressed against the membrane 131 all portions of the rubber membrane under the swage ring receive nearly equivalent degrees of compression thus equalizing the stress placed on the membrane 131. This equalization of the degree of compression equates to minimization of the amount of stress.

Figure 11:
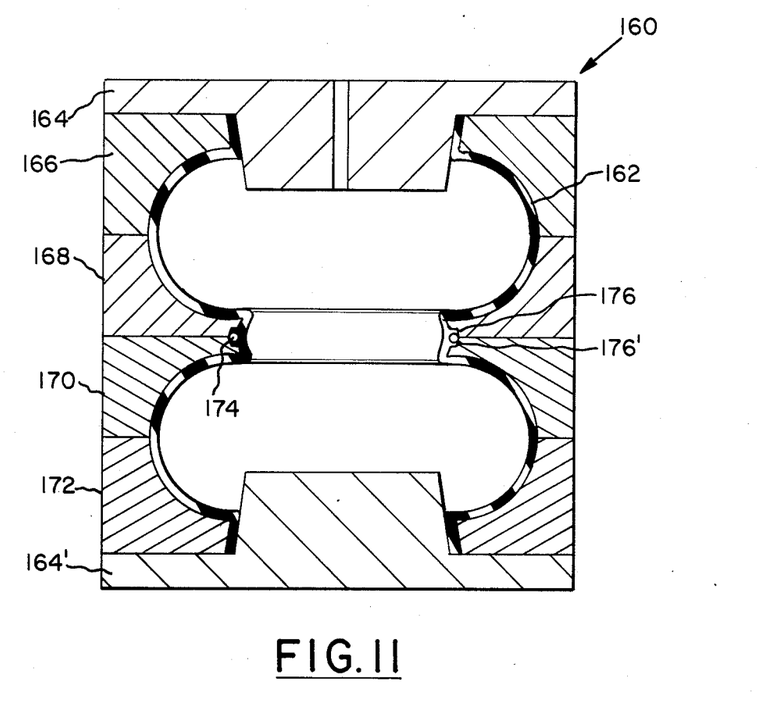
FIG. 11 is an axial cross-section of a of a mold used in manufacturing a double convolute bellows airspring containing a girdle ring.

FIG. 11 illustrates a double convolute bellows type airspring membrane 162 being cured in a mold 160 of this invention. The conical end plugs 164 and 164' compressively engage the membrane 162 and in the fully closed molding position. The annular segments of the mold 166,168,170 and 172 are axially in contact. A girdle ring 174 is inserted into circumferential recesses 176 and 176' in the center segments 168 and 170 prior to the insertion of the uncured tubular preform in the method of molding. All other aspects of the mold design and method of manufacturing the membrane 162 are as previously set forth herein.

Comparative Testing

Figure 12:
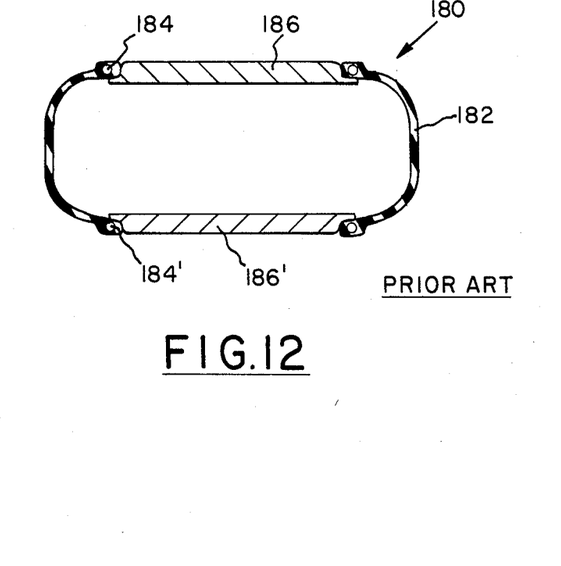
FIG. 12 is a cross-section of a beaded single convolute bellows airspring of the prior art.

The fully molded beadless bellows airspring was tested against a conventional beaded type bellows airspring to determine characteristic flex life. FIG. 12 illustrates a conventional single convolute bellows airspring 180 having a fully molded flex member 182 which contain beads 184 and 184' sealingly attached to the upper and lower retainers 186,186'. The beadless bellows type airspring of this invention included a fully molded beadless membrane having a wall thickness which has a lesser radial thickness at the axially outward portion of the neck. See the configuration of the mold of FIG. 4. The airspring is assembled in all respects similar to FIG. 9. The prior art airspring of FIG. 12 had a working stroke of 1.6 (40 mm) to 3.2 (80 mm) inches and a nominal diameter of 5 (127 mm)inches. The airspring of this invention had a working stroke of 1.8 (46 mm) to 3.8 (97 mm) inches and a nominal diameter of 5 (127 mm) inches. The prior art airspring of FIG. 12 will be designated airspring B and the airspring of this invention airspring A. The test procedure is one in which the upper and lower retainers are mounted on axially moveable arms and the airspring is cycled through its full working stroke until it fails or is removed. Table I sets forth the test data.

TABLE I

| Airspring Identification | Stroke (mm) | (000's) Cycles | Observations |
|---|---|---|---|
| Type A (Beadless) | 46–86 | 1,720 | Removed - no failure |
| | 46–86 | 1,417 | Removed - no failure |
| | 46–96 | 1,700 | Still running |
| | 46–96 | 1,200 | Still running |
| Type B (Beaded) | 41–81 | 216 | Leaks |
| | 41–81 | 326 | Leaks |
| | 41–81 | 20 | Leaks |
| | 41–81 | 14 | Leaks |
| | 41–81 | 25 | Burst |

The data presented in Table I clearly indicates the superior flex performance of the airspring of this invention incorporating the tapered wall thickness of the flex member in the neck portion and the indexing ribs which allow exact placement of the swage rings. It is generally observed that the failure for the beaded type bellows airspring Type B was localized to the area adjacent to the bead. This is generally attributed to localized stresses which develop due to the turnup of fabric overlapping the bead. This discontinuity of the bead contributes to localized stressing in all beaded constructions. The stressing is especially pronounced in small stroke actuators such as the one tested in Table I.

Many modifications and variations may be made in the techniques and structures described herein and depicted in the accompanying drawings without departing from the scope of the present invention. Accordingly, it should be readily understood that the embodiments described and illustrated herein are illustrative only and are not intended as limitations on the scope of the present invention.

What is claimed is:

1. A method for molding non-uniform diameter, flexible membranes for airsprings in a mold having a plurality of coaxial annular segments including a top and a bottom annular segment each containing a coaxial circular end bore with an inward taper, said plurality of segments forming a mold cavity having a predetermined shape said method comprising the steps of:
   (a) plying up a plurality of rubber and fabric layers to form a uniform diameter, beadless, tubular preform with a predetermined wall thickness, having a first and second end portions;
   (b) inserting said tubular preform into said mold;
   (c) positioning said first and said second end of said preform onto first and second conical end plugs coaxially spaced away from said circular end bores, said conical end plugs having a complimentary shape to fit axially into said inward taper of said circular end bores of the mold with enough clearance to accommodate the tubular preform wall thickness;
   (d) moving said top and said bottom segments axially outward to sealingly compress said tubular preform between said top and bottom end plugs and said top and bottom segments, said movement of the top and the bottom segments opening an annular space between said plurality of annular segments axially distal the end plugs;
   (e) applying pressure to the tubular preform to deform the preform radially outwardly against the mold cavity;
   (f) simultaneously with step (e) axially compressing said annular segments to gradually close up said annular space, at a rate sufficient to accommodate the axial shortening of the preform as it expands radially outward under pressure of step (e);
   (g) continuing steps (e) and (f) until said preform completely conforms to the mold cavity and the plurality of annular segments of the mold are axially compressed together;
   (h) heating said preform to permanently set the non-tubular shape by vulcanizing the rubber layers of said preform to form a non-uniform diameter, flexible membrane;
   (i) removing said membrane from said mold.

2. A method according to claim 1 further comprising the step of placing a girdle ring in a recess provided on at least one annular segment adjacent said mold cavity, said step of placing to precede said inserting step (b).

3. A method according to claim 1 wherein said applying pressure of step (e) is done by steadily increasing the pressure while simultaneously axially compressing the annular segments.

4. A method according to claim 1 wherein said mold has at least four annular segments and said movement of step (d) opens up annular spaces between each of said four annular segments.

5. A method according to claim 1 wherein said positioning of step (c) includes moving said first end plug axially away from said end bore a distance sufficient to allow the insertion of said tubular preform into said end bore by moving the preform axially downward onto the second end plug and subsequently moving said first end plug axially toward said end bore until the end plug is positioned within said tubular preform.

6. An airspring with a beadless, molded, non-uniform diameter, flexible membrane comprising:
   (a) an upper retainer;
   (b) a lower retainer axially spaced apart from said upper retainer;
   (c) a non-uniform diameter, beadless, air impervious, flexible membrane having a first and a second open end, at least one of said ends having a tapered neck portion with a radial wall thickness which decreases toward the axially extreme end of the neck portion, said membrane being joined with said upper retainer and said lower reainer to form a working cavity therebetween; and
   (d) an upper ring and a lower ring compressively engaging the membrane against the upper retainer and the lower retainer, thereby forming an airtight seal between the membrane and the upper and the lower retainers.

7. An airspring of claim 6 wherein said neck portion of said membrane further comprises a pair of circumferential indexing ribs extending radially outward from said neck portion spaced axially apart and wherein at least one of said upper ring and lower ring is positioned between said pair of circumferential indexing ribs.

8. An airspring of claim 6 wherein at least one of said upper retainer or lower retainers in compressive contact with said tapered neck portion has a circumferential serrated clamping portion having a taper.

9. An airspring of claim 8 wherein said clamping portion taper is complimentary to the tapered neck portion of the membrane.

10. An airspring according to claim 8 wherein said retainer clamping portion taper is less than said tapered neck portion of the membrane.

11. An air spring with a beadless, molded, non-uniform diameter, flexible membrane consisting essentially of:
   (a) an upper retainer;
   (b) a lower retainer axially spaced apart from said upper retainer;
   (c) a non-uniform diameter, beadless, air impervious, flexible membrane having a first and a second open end, at least one of said ends having a tapered neck portion with a radial wall thickness which tapers toward the axially extreme end of the neck portion, said membrane having as the sole reinforcement, a plurality of axially extending reinforcement layers which extend uniformly throughout said flexible membrane including said tapered neck portion, said membrane being joined with said upper retainer and said lower retainer to form a working cavity therebetween; and
   (d) an upper ring and a lower ring compressively engaging the membrane against the upper retainer and the lower retainer, thereby forming an airtight seal between the membrane and the upper and the lower retainers.

12. An airspring with a beadless, molded, non-uniform diameter, flexible membrane comprising:
   (a) an upper retainer;
   (b) a lower retainer axially spaced apart from said upper retainer;
   (c) a non-uniform diameter, beadless, air impervious, flexible membrane having a first and a second open end, at least one of said ends having a tapered neck portion with a pair of circumferential indexing ribs extending radially outward from said neck portion and spaced axially apart, said membrane being joined with said upper retainer and said lower retainer to form a working cavity therebetween; and
   (d) an upper ring and a lower ring compressively engaging the membrane against the upper retainer and the lower retainer, thereby forming an airtight seal between the membrane and the upper and the lower retainers, and at least one of said upper ring and lower rings being axially positioned between said pair of circumferential indexing ribs.

13. An air spring of claim 12 wherein said radial wall thickness decreases toward the axially extreme end of the neck portion.

14. An airspring of claim 12 wherein said radial wall thickness increases toward the axially extreme end of the neck portion.

* * * * *